US012770167B2

(12) United States Patent
Mo et al.

(10) Patent No.: US 12,770,167 B2
(45) Date of Patent: Oct. 20, 2026

(54) DATA PROCESSING SYSTEM AND METHOD, TERMINAL DEVICE, AND SERVER

(71) Applicant: Petal Cloud Technology Co., Ltd., Dongguan City (CN)

(72) Inventors: Lan Mo, Nanjing (CN); Xing Wang, Nanjing (CN)

(73) Assignee: Petal Cloud Technology Co., Ltd., Dongguan City (CN)

( * ) Notice: Subject to any disclaimer, the term of this patent is extended or adjusted under 35 U.S.C. 154(b) by 20 days.

(21) Appl. No.: 18/250,923

(22) PCT Filed: Aug. 31, 2021

(86) PCT No.: PCT/CN2021/115781
§ 371 (c)(1),
(2) Date: Apr. 27, 2023

(87) PCT Pub. No.: WO2022/088940
PCT Pub. Date: May 5, 2022

(65) Prior Publication Data
US 2023/0401609 A1 Dec. 14, 2023

(30) Foreign Application Priority Data
Oct. 28, 2020 (CN) .......................... 202011171118.2

(51) Int. Cl.
*G06Q 30/02* (2023.01)
*G06Q 30/0241* (2023.01)

(52) U.S. Cl.
CPC ................................ *G06Q 30/0277* (2013.01)

(58) Field of Classification Search
CPC ....... G06Q 30/0277; G06F 8/36; G06F 9/445; G06F 8/76; G06F 9/44505; G06F 9/44521
See application file for complete search history.

(56) References Cited

U.S. PATENT DOCUMENTS

2012/0232985 A1* 9/2012 Lasker .................. G06Q 30/02 705/14.41
2014/0282608 A1* 9/2014 Biancalana ............ G06F 9/544 719/312

(Continued)

FOREIGN PATENT DOCUMENTS

CN 103491111 A * 1/2014 .............. G06F 8/61
CN 105589506 A 5/2016

(Continued)

OTHER PUBLICATIONS

A Reference Model for Internet , of Things Middleware Mauro A. A. da CruzIEEE Internet of Things Journal, vol. 5, No. 2, pp. 871 and 872 (Year: 2018).*

(Continued)

*Primary Examiner* — Ilana L Spar
*Assistant Examiner* — Darnell A Pouncil
(74) *Attorney, Agent, or Firm* — Slater Matsil, LLP

(57) ABSTRACT

A server and a terminal device, the server providing media service platform (SSP), where the terminal device is loaded with a mobile service and at least one app. The server generates an advertising software development kit (SDK) integrated package in response to an advertising platform selection operation performed by an app developer on the SSP, and loads the advertising SDK integrated package into the mobile service, where the advertising SDK integrated package includes an SDK of an advertising platform that supports ad mediation and that is selected by the app developer. The terminal device invokes the advertising SDK integrated package in the mobile service based on the app, and presents an advertisement corresponding to the advertising platform in the advertising SDK integrated package.

21 Claims, 7 Drawing Sheets

(56) References Cited

U.S. PATENT DOCUMENTS

| | | | | |
|---|---|---|---|---|
| 2015/0095140 A1* | 4/2015 | Greenzeiger | ...... | G06Q 30/0246 705/14.43 |
| 2016/0378578 A1* | 12/2016 | Nandakumar | ........ | G06F 11/302 719/328 |
| 2017/0255835 A1* | 9/2017 | Price | .................... | G06V 30/224 |

FOREIGN PATENT DOCUMENTS

| | | |
|---|---|---|
| CN | 109213533 A | 1/2019 |
| CN | 111445274 A | 7/2020 |

OTHER PUBLICATIONS

Jin Ling et al: "MAdLens: Investigating Into Android In-App Ad Practice at API Granularity", IEEE Transactions on Mobile Computing. IEEE Service Center, Los Alamitos, CA, US, vol. 20, No.3, Nov. 14, 2019, total 18 pages.

* cited by examiner

DATA PROCESSING SYSTEM AND METHOD, TERMINAL DEVICE, AND SERVER

CROSS-REFERENCE TO RELATED APPLICATIONS

This application is a national stage of International Application No. PCT/CN2021/115781, filed on Aug. 31, 2021, which claims priority to Chinese Patent Application No. 202011171118.2 filed on Oct. 28, 2020. Both of the aforementioned applications are hereby incorporated by reference in their entireties.

TECHNICAL FIELD

This application relates to the field of computer technologies, and in particular, to a data processing system and method, a terminal device, and a server.

BACKGROUND

As internet technologies continuously develop and change, a user can obtain more diversified information by using the internet. For example, when browsing a web page, the user obtains information about a learning material from a learning material advertisement presented on the page; when using a software application (application, APP), the user obtains information about a commodity from a shopping advertisement presented on the app; and the like.

An advertiser may place an advertisement by using an advertising platform. A same advertiser may place advertisements on different advertising platforms. A same advertising platform may also receive advertisements placed by different advertisers. Advertisements placed by different advertising platforms may be presented on a same app or different apps. However, software development kits (software development kit, SDK) of different advertising platforms provide different interfaces. For adaptation to SDKs of a plurality of advertising platforms, an app developer needs to make modifications, to implement interworking with different advertising platforms. The workload is heavy. Therefore, advertisement mediation (advertisement mediation, Ad Mediation) is introduced. Ad mediation is equivalent to an intermediary SDK, which can integrate SDKs of other advertising platforms. In this case, to complete interworking with the plurality of advertising platforms, the app developer only needs to call an interface of the intermediary SDK. In this manner, the workload of the app developer is reduced.

During implementation of ad mediation in a relevant technology, when integrating SDKs of advertising platforms, an app developer needs to pack all SDKs of advertising platforms that support ad mediation into an app, to advertise by using the app for advertisers who place advertisements on the advertising platforms. However, once some advertising platforms no longer support ad mediation, or some advertising platforms that support ad mediation are newly added, the app needs to be upgraded again to better present advertisement content by using the app. This undoubtedly increases a workload of the app developer.

SUMMARY

Based on this, this application provides a data processing system and method, a terminal device, and a server, to reduce a workload of an app developer and upgrade costs of an app.

According to a first aspect, an embodiment of this application provides a data processing system. The data processing system includes a server and a terminal device. The server provides a media service platform (supply side platform, SSP). The terminal device is loaded with a mobile service and at least one app. The server is configured to: generate an advertising SDK integrated package in response to an advertising platform selection operation performed by an app developer on the SSP, and load the advertising SDK integrated package into the mobile service, where the advertising SDK integrated package includes an SDK of an advertising platform that supports ad mediation and that is selected by the app developer. The terminal device is configured to: invoke the advertising SDK integrated package in the mobile service based on the app, and present an advertisement corresponding to the advertising platform in the advertising SDK integrated package.

When an advertising platform that supports ad mediation is newly added to or deleted from the app, the app developer only needs to reconfigure, on the SSP, a required advertising platform that supports ad mediation. The server may update the advertising SDK integrated package based on the reconfigured advertising platform that supports ad mediation. The app only needs to invoke an updated advertising SDK integrated package to present an advertisement corresponding to the advertising platform in the updated advertising SDK integrated package. In this way, a quantity of times the app is upgraded is reduced. In addition, when an advertising platform that supports ad mediation changes, the app developer does not need to recompile code, reducing a workload of the app developer.

In a possible design, the SSP includes a mediation (mediation) advertising platform selection and configuration module and an advertising SDK integrated package management module. The mediation advertising platform selection and configuration module is configured to provide the app developer with a candidate advertising platform that supports ad mediation. The advertising SDK integrated package management module is configured to update the advertising SDK integrated package in the mobile service.

It should be noted that when an advertising platform that supports ad mediation is updated by using the SSP, the following two cases can be avoided: a case in which the app is frequently upgraded, and a case in which the app developer needs to recompile code when an advertising platform that supports ad mediation changes.

In a possible design, the app includes a mediation adapter (adapter) interface and a dynamic loader (DynamicLoader) module. The mediation adapter interface is configured to interwork with SDKs of different advertising platforms. The DynamicLoader module is configured to load the advertising SDK integrated package from the mobile service.

It should be noted that when the mediation adapter interface and the DynamicLoader module are configured on the app, the app can load the advertising SDK integrated package from the mobile service, to better present an advertisement corresponding to an advertising platform.

In a possible design, the mobile service includes an advertising component and the advertising SDK integrated package. The advertising component is configured to create an information transmission channel between the app and the SSP. The advertising SDK integrated package is configured to integrate SDKs of advertising platforms that support ad mediation.

In a possible design, the server is further configured to determine configuration information in response to the advertising platform selection operation performed by the app developer on the SSP, where the configuration information includes an information list of SDKs of advertising platforms that support ad mediation. The terminal device is further configured to invoke the advertising SDK integrated package based on the app after obtaining the configuration information.

According to a second aspect, an embodiment of this application provides a data processing method: A server may generate an advertising SDK integrated package in response to an advertising platform selection operation performed by an app developer on an SSP, where the advertising SDK integrated package includes an SDK of an advertising platform that supports ad mediation and that is selected by the app developer; and the server may load the advertising SDK integrated package into a mobile service, so that an app invokes the advertising SDK integrated package from the mobile service when running, where the app is configured to present an advertisement corresponding to the advertising platform in the advertising SDK integrated package.

In a possible design, the server determines, in response to the advertising platform selection operation performed by the app developer on the SSP, a selected advertising platform that supports ad mediation; and the server packs an SDK of the selected advertising platform that supports ad mediation, to generate the advertising SDK integrated package.

In a possible design, the server receives a selection operation performed by the app developer on the SSP for advertising platform updating, and updates the advertising SDK integrated package; and the server loads an updated advertising SDK integrated package into the mobile service.

In a possible design, the server determines configuration information in response to the advertising platform selection operation performed by the app developer on the SSP, so that the app invokes the advertising SDK integrated package based on the configuration information, where the configuration information includes an information list of SDKs of advertising platforms that support ad mediation.

According to a third aspect, an embodiment of this application provides a data processing method: A terminal device receives an advertising SDK integrated package by using a mobile service, where the advertising SDK integrated package is generated after an app developer selects an advertising platform that supports ad mediation on an SSP; and the terminal device invokes the advertising SDK integrated package based on an app, and presents an advertisement corresponding to the advertising platform in the advertising SDK integrated package.

In a possible design, the app includes a mediation adapter interface and a DynamicLoader module. The terminal device may load the advertising SDK integrated package by using the DynamicLoader module; and interwork with SDKs of different advertising platforms in the advertising SDK integrated package by using the mediation adapter interface.

In a possible design, the mobile service further includes an advertising component. The terminal device may create an information transmission channel between the app and the SSP by using the advertising component.

In a possible design, the terminal device may obtain configuration information, where the configuration information is determined in response to the advertising platform selection operation performed by the app developer on the SSP; and the terminal device may invoke the advertising SDK integrated package based on the app and the configuration information.

According to a fourth aspect, an embodiment of this application provides a server. The server includes one or more processors and one or more memories. The one or more memories store one or more computer programs. The one or more computer programs include instructions. When the instructions are executed by the one or more processors, the server is enabled to perform the following steps: generating an advertising SDK integrated package in response to an advertising platform selection operation performed by an app developer on an SSP, where the advertising SDK integrated package includes an SDK of an advertising platform that supports ad mediation and that is selected by the app developer; and loading the advertising SDK integrated package into a mobile service, so that an app invokes the advertising SDK integrated package from the mobile service when running, where the app is configured to present an advertisement corresponding to the advertising platform in the advertising SDK integrated package.

In a possible design, when the instructions are executed by the one or more processors, the server is enabled to further perform the following steps:

in response to the advertising platform selection operation performed by the app developer on the SSP, determining a selected advertising platform that supports ad mediation; and packing an SDK of the selected advertising platform that supports ad mediation, to generate the advertising SDK integrated package.

In a possible design, when the instructions are executed by the one or more processors, the server is enabled to further perform the following steps: receiving a selection operation performed by the app developer on the SSP for advertising platform updating, and updating the advertising SDK integrated package; and loading an updated advertising SDK integrated package into the mobile service.

In a possible design, when the instructions are executed by the one or more processors, the server is enabled to further perform the following step: determining configuration information in response to the advertising platform selection operation performed by the app developer on the SSP, so that the app invokes the advertising SDK integrated package based on the configuration information, where the configuration information includes an information list of SDKs of advertising platforms that support ad mediation.

According to a fifth aspect, an embodiment of this application provides a terminal device. The terminal device includes one or more processors and one or more memories. The one or more memories store one or more computer programs. The one or more computer programs include instructions. When the instructions are executed by the one or more processors, the terminal device is enabled to perform the following steps: receiving an advertising SDK integrated package by using a mobile service, where the advertising SDK integrated package is generated after an app developer selects an advertising platform that supports ad mediation on a media service platform SSP; and invoking the advertising SDK integrated package based on an app, and presenting an advertisement corresponding to the advertising platform in the advertising SDK integrated package.

In a possible design, the app includes a mediation adapter interface and a DynamicLoader module. When the instructions are executed by the one or more processors, the server is enabled to further perform the following steps: loading the advertising SDK integrated package by using the DynamicLoader module; and interworking with SDKs of different advertising platforms in the advertising SDK integrated package by using the mediation adapter interface.

In a possible design, the mobile service further includes an advertising component. When the instructions are executed by the one or more processors, the terminal device is enabled to further perform the following step: creating an information transmission channel between the app and the SSP by using the advertising component.

In a possible design, when the instructions are executed by the one or more processors, the terminal device is enabled to further perform the following steps: obtaining configuration information, where the configuration information is determined in response to the advertising platform selection operation performed by the app developer on the SSP; and invoking the advertising SDK integrated package based on the app and the configuration information.

According to a sixth aspect, this application provides a computer-readable storage medium. The computer storage medium stores computer-readable instructions. When a computer reads and executes the computer-readable instructions, the computer is enabled to perform the solution according to any one of the implementations of the first aspect.

According to a seventh aspect, this application provides a computer program product. When a computer reads and executes the computer program product, the computer is enabled to perform the solution according to any one of the implementations of the first aspect.

For technical effects that can be achieved by the second aspect to the seventh aspect, refer to descriptions of technical effects that can be achieved by corresponding possible design solutions in the first aspect. Details are not described herein again in this application.

DETAILED DESCRIPTION OF ILLUSTRATIVE EMBODIMENTS

Figure 1:
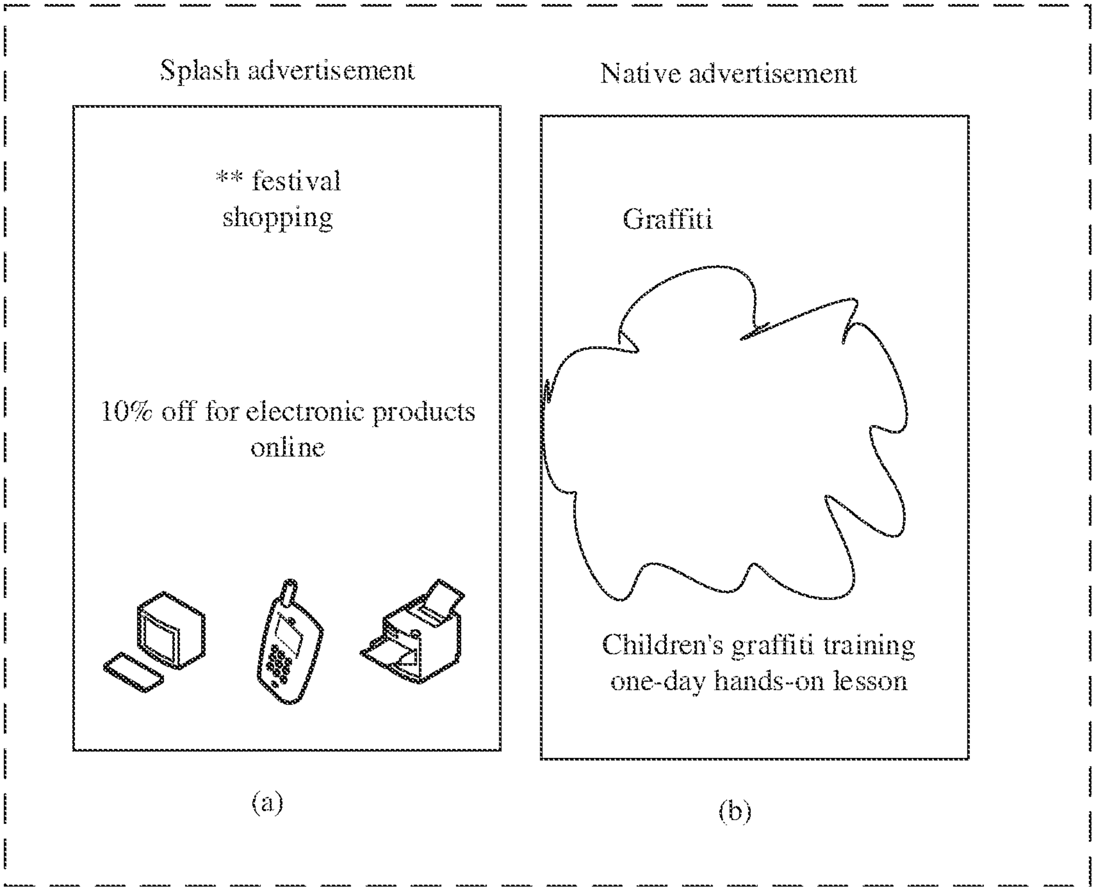
FIG. 1 is a schematic diagram of a presentation screen of an advertisement according to an embodiment of this application.

To make objectives, technical solutions, and advantages of this application clearer, the following describes technical solutions in embodiments of this application in detail with reference to the accompanying drawings in embodiments of this application.

In this application, "and/or" describes an association relationship between associated objects, and indicates that three relationships may exist. For example, A and/or B may indicate the following three cases: Only A exists, both A and B exist, and only B exists, where A and B may be singular or plural. In addition, unless otherwise stated, ordinal numbers such as "first" and "second" in embodiments of this application are for distinguishing between a plurality of objects, but are not intended to limit an order, a time sequence, priorities, or importance of the plurality of objects.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

To better describe the solutions in this application, the following first explains terms in this application.

Advertiser: An advertiser is an initiator of an advertising activity, and may be a business that sells or advertises products and services on the internet. Any business that promotes or sells its products or services may be an advertiser.

App: An app belongs to an advertisement presenting party, and is an application that can present an advertisement.

Advertising platform: An advertising platform is equivalent to an intermediary and can interwork with an advertiser and an app. An advertising platform may interwork with a plurality of apps, and different advertising platforms may interwork with a same app or different apps. For example, an advertising platform 1 may interwork with an app 1, an app 2, and an app 3, and an advertising platform 1 may interwork with the app 1, the app 2, and an app 5. If an advertiser places an advertisement 1 of a product 1 on the advertising platform 1, the advertisement 1 of the advertiser may be presented on the app 1, the app 2, and the app 3. If the advertiser places an advertisement 2 of a product 2 on the advertising platform 2, the advertisement 2 of the advertiser may be presented on the app 1, the app 2, and the app 3. The example is merely for illustration purposes, and does not specifically limit a quantity of advertising platforms on which an advertiser can place an advertisement and a quantity of apps with which an advertising platform can interwork.

Advertisement position: An advertisement position is a position at which an advertisement is presented on an app. At different positions, advertisements are presented in different forms. For example, in response to an operation of tapping an app, an advertisement presented on an initial screen of the app is a splash advertisement; and an advertisement presented on an operation page of an app is a native advertisement. In addition, a banner advertisement presented on an operation page of an app and other advertisement forms are further included. Details are not described herein in this application. FIG. 1 is a diagram of a presentation screen of an advertisement. (a) in FIG. 1 is a diagram of a screen of a splash advertisement. (a) in FIG. 1 shows an advertisement for  festival shopping promotions with 10% off for electronic products online. (b) in FIG. 1 is a diagram of a screen of a native advertisement. (b) in FIG. 1** shows a graffiti screen and an advertisement for children's graffiti training that are presented on an operation page of an app.

Service provider: A service provider provides an SSP and a mobile service, so that the SSP generates an advertising SDK integrated package after an app developer configures a required advertising platform on the SSP. The SSP transmits the advertising SDK integrated package to the mobile service, so that an app advertises, by loading the advertising SDK integrated package in the mobile service, for advertisers who place advertisements on advertising platforms.

Mobile service: A mobile service is a mobile service architecture that is provided by a service provider, can be installed on a terminal device, can be open to terminal devices, operating system platforms, and developers, and provides a plurality of service capabilities. It should be noted that any mobile service that can be applied to Android (Android) may be applicable to this application, for example, huawei mobile services core (huawei mobile services core, HMS Core). HMS Core provides users of huawei terminal devices with basic services such as huawei accounts and payment. After logging in by using a huawei account, a user can access all huawei services such as huawei application market, cloud space, and exercise and health. In addition, HMS Core provides applications of developers with services such as message pushing, quick login by using a huawei account, in-application payment, positioning, maps, games, and machine learning, helping applications of developers bring better user experience to users of huawei terminal devices. In this application, only HMS Core is used as an example for description. However, in actual application, the mobile service is not limited to HMS Core.

Figure 2:
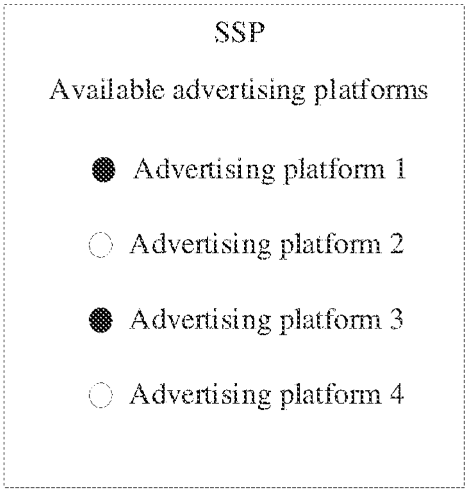
FIG. 2 is a schematic diagram of selecting advertising platforms on an SSP according to an embodiment of this application.

SSP: An SSP is provided by a service provider. An app developer can configure, on the SSP, a required advertising platform that supports a mediation SDK. FIG. 2 shows advertising platforms that support ad mediation: an advertising platform 1, an advertising platform 2, an advertising platform 3, and an advertising platform 4. If a company to which an app belongs signs an advertising agreement (advertising on the app for advertisers corresponding to the advertising platforms 1-3) with companies corresponding to the advertising platform 1 and the advertising platform 3, an app developer may select the advertising platform 1 and the advertising platform 3 (illustrated by fillings in black in FIG. 2) on an SSP. Based on a data processing operation performed by a server, SDKs of the advertising platform 1 and the advertising platform 3 may be packed, to determine an advertising SDK integrated package that includes the SDKs of the advertising platform 1 and the advertising platform 3.

In addition, the app developer may further create and configure an advertisement position on the SSP. If an advertisement 1 of the advertiser corresponding to the advertising platform 1 and an advertisement 3 of the advertiser corresponding to the advertising platform 3 need to be presented on an X app, an app developer may create an advertisement position identity (identity document, ID) for the advertisement 1 on the SSP based on requirements of the advertisers corresponding to the advertising platform 1 and the advertising platform 2, for example, 1 for an advertisement position ID of a splash advertisement and 2 for an advertisement position ID of a native advertisement; and configure an advertisement position ID corresponding to the advertisement 1 to 1 on the SSP, that is, to present the advertisement 1 on an initial screen of the app.

In addition, a form of presentation of advertisements is not specifically limited herein in this application. Advertisements may be presented simultaneously, may be presented sequentially, or may be presented in different time slots. For example, after a user's instruction of performing an operation on the X app is obtained, ten minutes after the user performs the operation on the X app, the advertisement 1 is presented every 15 minutes, and the advertisement 2 is presented every 35 minutes.

Figure 3:
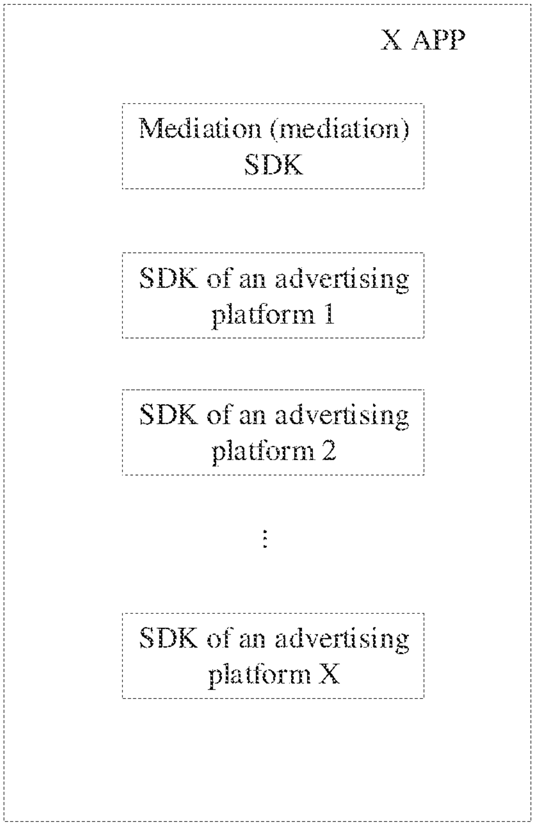
FIG. 3 is a schematic diagram of data packets integrated in an app.

As described in the background, when integrating SDKs of advertising platforms, an app developer packs SDKs of all advertising platforms that support ad mediation into an app. In FIG. 3, not only a mediation SDK but also SDKs of advertising platforms that support ad mediation are integrated in an X app, for example, an SDK of an advertising platform 1, an SDK of an advertising platform 2, and an SDK of an advertising platform n. FIG. 3 illustrates only one app. However, in actual application, app developers of apps that can present advertisements all integrate the mediation SDK and SDKs of advertising platforms that support ad mediation into the apps.

In addition to the mediation SDK, SDKs of advertising platforms that support ad mediation are integrated in an app. Therefore, an app developer needs to determine, whether in a program development phase or in a compilation result running phase, advertising platforms that support ad mediation, to pack SDKs of the advertising platforms that support ad mediation into the app. Besides, when an advertising platform that supports ad mediation is newly added, an SDK of the advertising platform to be newly added needs to be packed into the app; and when an advertising platform that does not support ad mediation is deleted, an SDK of the advertising platform to be deleted needs to be deleted from the app. Regardless of an advertising platform addition operation or an advertising platform deletion operation, the app developer needs to recompile code and upgrade the app so that the app can advertise for advertisers corresponding to updated advertising platforms. Moreover, the packed advertising platforms in the app cannot be updated in real time, and the advertising platforms can be updated only by recompiling code and upgrading the app. This manner undoubtedly increases a workload of the app developer. In addition, when advertising platforms that support ad mediation continuously change, frequently upgrading the app also brings poor experience to users of the app. Based on this, this application provides a data processing method, to reduce a workload of an app developer and upgrade costs of an app.

Figure 4:
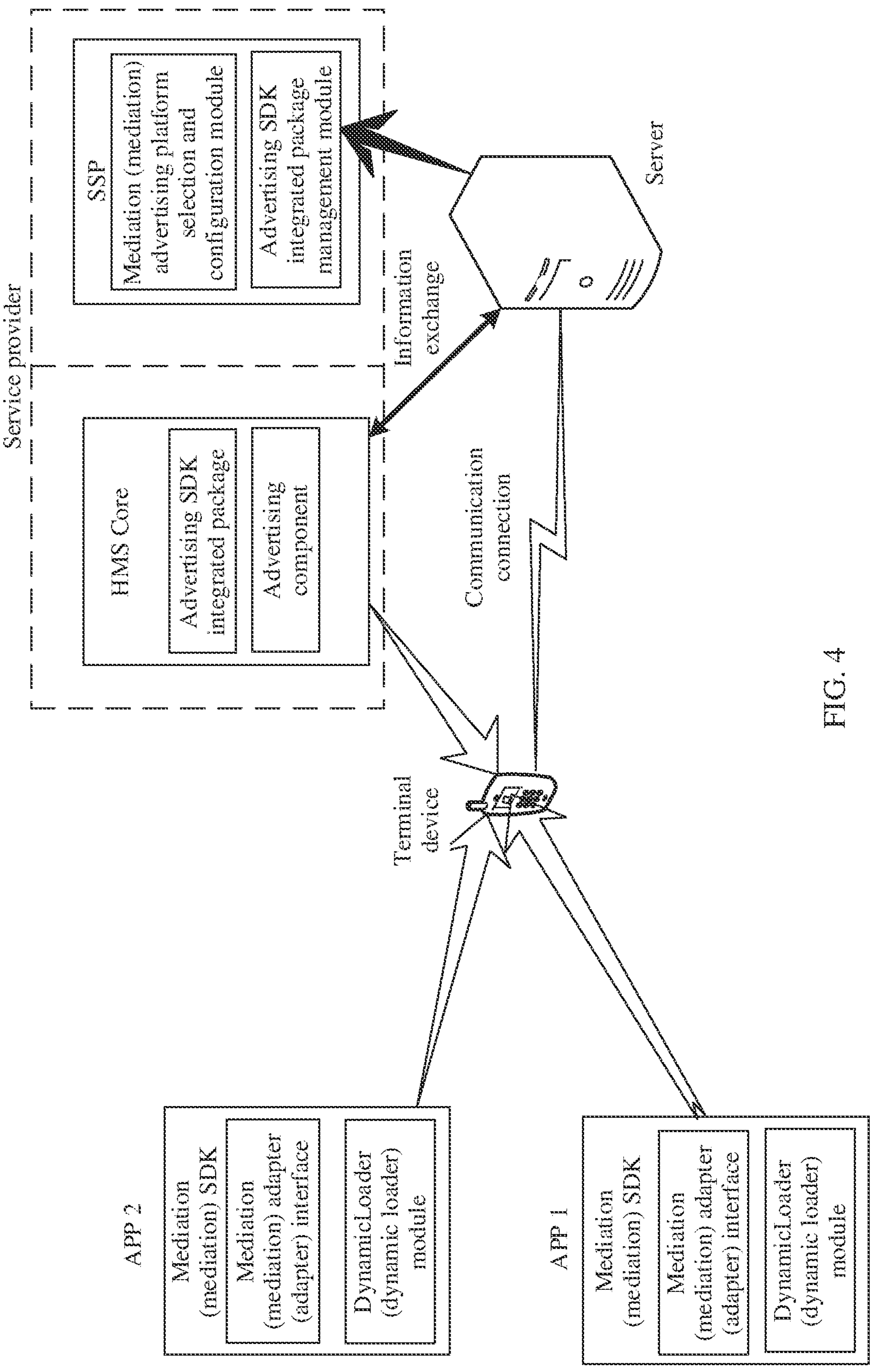
FIG. 4 is a schematic diagram of an architecture of a data processing system according to an embodiment of this application.

FIG. 4 is a schematic diagram of an architecture of a data processing system applicable to this application. In the schematic diagram of the architecture, a terminal device and a server are included. Between the terminal device and the server, data may be transmitted through wired or wireless communication. This is not specifically limited herein in this application. An app corresponding to an advertisement presenting party may be installed on the terminal device. The app may be a native app (that is, a software application pre-installed on the terminal device before delivery) of the terminal device, or may be downloaded by the terminal device from a third-party application. A source of the app is not specifically limited herein in this application. In FIG. 4, an example is used for description in which the terminal device may be loaded with an app 1 and an app 2. However, in actual application, a quantity and types of apps corresponding to the advertisement presenting party are not limited. The terminal device is further loaded with HMS Core. HMS Core may perform data computing processing independently, or may perform data computing processing by using the server after exchanging information with the server. A data processing manner of HMS Core is not specifically limited in this application. In FIG. 4, that HMS Core performs data computing processing by using the server after exchanging information with the server is used for illustration.

To meet a requirement of the solutions in this application, FIG. 4 illustrates that the server further provides an SSP so that a developer of the app 1 or the app 2 can configure a required advertising platform on the SSP. However, in actual application, the server can not only provide a data processing service for the SSP, but also provide a data processing service for another service, for example, a service such as converting a low-resolution video into an ultra-high-definition video. This is not specifically limited herein in this application.

It should be noted that when the solutions in this application are applied, an app developer only needs to download a mediation SDK from a service provider into an app, with no need to integrate an SDK of another advertising platform that supports ad mediation. FIG. 4 illustrates that mediation SDKs in the app 1 and the app 2 may include a mediation adapter interface and a DynamicLoader module. The mediation adapter interface is configured to interwork with SDKs of different advertising platforms. The DynamicLoader module is configured to remotely and dynamically load an advertising SDK integrated package from HMS Core. In addition, the mediation SDK may further include an application programming interface (application programming interface, API), so that the app developer can invoke the mediation SDK by using the API.

When being applied to this application, HMS Core may include an advertising component and the advertising SDK integrated package. The advertising component may provide an interaction channel between the mediation SDK and the SSP. The advertising SDK integrated package may include SDKs of a plurality of advertising platforms that support ad mediation, and a mediation adapter implementation class related to the SDKs of the advertising platforms that support ad mediation.

The SSP may include a mediation advertising platform selection and configuration module and an advertising SDK integrated package management module. The app developer may independently select a required advertising platform by using the mediation advertising platform selection and configuration module, and may update the advertising SDK integrated package in a mobile service by using the advertising SDK integrated package management module.

When the data processing system provided in this application is used, and when an advertising platform that supports ad mediation needs to be added to an app or an advertising platform needs to be deleted from an app, an app developer only needs to select, on the mediation advertising platform selection and configuration module in the SSP, the advertising platform that needs to be added or deleted. After the advertising SDK integrated package in the mobile service is updated by using the advertising SDK integrated package management module in the SSP, an advertisement corresponding to the advertising platform is added to or deleted from the app after an updated advertising SDK integrated package is loaded by using the DynamicLoader module when the app is running. In this manner, not only compilation work of the app developer is reduced, but also the advertising platforms are updated in real time.

Figure 5:
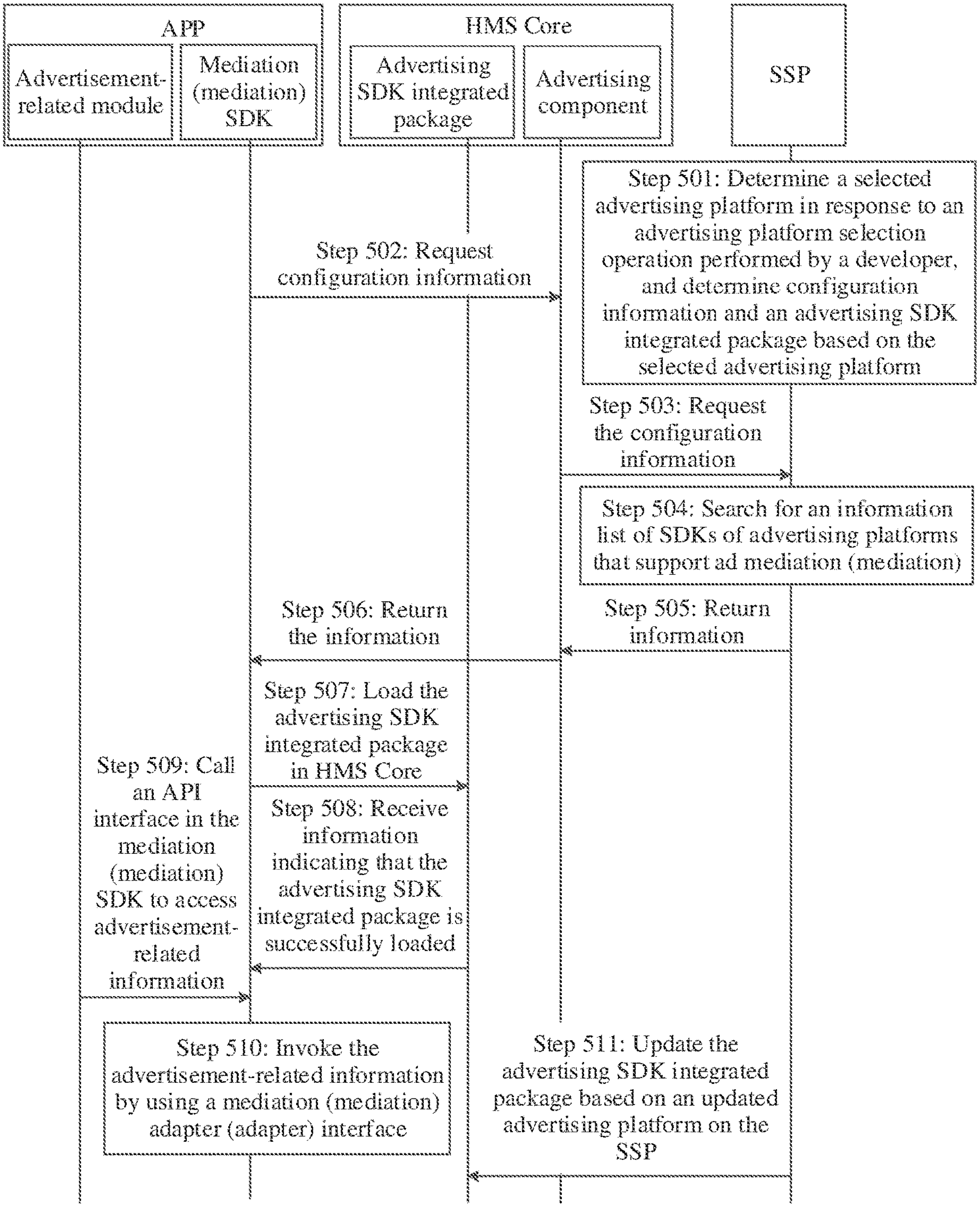
FIG. 5 is a schematic flowchart of a data processing method according to an embodiment of this application.

The following describes the solutions in this application with reference to a data processing method shown in FIG. 5. In FIG. 5, an app of an advertisement presenting party, HMS Core, and an SSP are included. It should be noted that although HMS Core is provided by a service provider, HMS Core and the app may be both installed on a terminal device. In FIG. 5, only one app is used for illustration. However, during actual application, different apps may all be loaded, by using HMS Core, with information corresponding to an SDK of an advertising platform. A quantity and types of apps are not specifically limited herein in this application. Any app can perform data processing similar to a data processing procedure shown in FIG. 5. Details are not described herein in this application. Only an operation procedure of one of the apps is used as an example for description. It should be noted that when the data processing method in this application is performed, an app developer may download a mediation SDK from the service provider into the app, and select, on the SSP, an advertising platform that supports ad mediation and that needs to be used. The SSP may perform the following step.

Step 501: Determine a selected advertising platform in response to an advertising platform selection operation performed by the app developer, and determine configuration information and an advertising SDK integrated package based on the selected advertising platform. The configuration information includes an information list of SDKs of advertising platforms that support ad mediation.

It should be noted that a mediation advertising platform selection and configuration module in the SSP may be used by the app developer to independently select an SDK of an advertising platform that needs to be used. Content that may be included in configuration information in the configuration module is shown in Table 1. Table 1 shows a list of SDKs of advertising platforms that support ad mediation. The list may be included in the configuration information and stored in an info format. The SDKInfo format may be shown in Table 2, and includes a name (name) of an advertising platform and a number (SDKID) of an SDK of the advertising platform. The name of the advertising platform and the number of the SDK of the advertising platform may be both stored in a string (String) type.

TABLE 1

| Name | Type | Meaning |
|---|---|---|
| SDKInfos | List<SDKInfo> | Information list of SDKs of advertising platforms that support ad mediation |

TABLE 2

| Name | Type | Meaning |
|---|---|---|
| name | String | Name of an advertising platform |
| SDKID | String | Number of an SDK of an advertising platform, used to identify each SDK |

In addition, the configuration information may be alternatively stored in another format other than the info format, for example, a JSON format or another format. This is not specifically limited herein in this application. Any format that can be used for storing the configuration information is applicable to this application. The JSON format is shown below. However, in actual application, a storage format is not limited to the JSON format.

```
{
  "sdkInfos" : [
    {
      "name" : "ad sdk 1",
      "sdkId" : "mediation_sdk_1"
```

-continued

```
            },
            {
              "name" : "ad sdk 2",
              "sdkId" : "mediation_sdk_2"
            }
          ]
        }
```

In addition, after a developer corresponding to the app and an advertising platform determine an advertising agreement, advertisement information of an advertiser corresponding to the advertising platform may be presented on the app. The app developer may first select, on the SSP, an advertising platform that supports ad mediation as a selected advertising platform. Then, the SSP may determine configuration information and an advertising SDK integrated package based on an SDK of the selected advertising platform, and transmit the advertising SDK integrated package to HMS Core, so that the app can access the advertising SDK integrated package by using HMS Core when running. For example, the app developer selects, on the SSP, an advertising platform 1, an advertising platform 2, and an advertising platform 3 that support ad mediation. In this case, the SSP stores the advertising platform 1, the advertising platform 2, the advertising platform 3, and numbers of SDKs corresponding to the advertising platform 1, the advertising platform 2, and the advertising platform 3 as configuration information in the SSP. Then, the SSP transmits an advertising SDK integrated package to HMS Core, so that the app can access the advertising SDK integrated package by using HMS Core when running.

The app may perform the following step.

Step 502: Request the configuration information from an advertising component in HMS Core based on the mediation SDK in the app. The requested configuration information includes an information list of SDKs of advertising platforms that support ad mediation. The information list includes names of the advertising platforms and numbers of the SDKs of the advertising platforms (the advertising platforms corresponding to the SDKs can be learned of based on the numbers of the SDKs, for example, if a number of an SDK is i and the number i corresponds to an advertising platform 1, it can be learned that the SDK corresponding to the number i is an SDK of the advertising platform 1).

Under the premise that the app developer already selects the advertising platform 1, the advertising platform 2, and the advertising platform 3 on the SSP, the list in the requested configuration information may be shown in Table 3 below, and includes names of the advertising platforms 1 to 3 and the numbers of the SDKs corresponding to the advertising platforms 1 to 3.

TABLE 3

| Name of an advertising platform | Number of an SDK of an advertising platform |
|---|---|
| Advertising platform 1 | Number 1 |
| Advertising platform 2 | Number 2 |
| Advertising platform 3 | Number 3 |

It should be noted that the advertising component may provide an interaction channel between the mediation SDK and the SSP. Therefore, a mobile service can send a configuration information request to the SSP by using the advertising component. The advertising component may provide the mediation SDK with an interface for remote calling, so that the mediation SDK can invoke the advertising SDK integrated package in the mobile service. The advertising component internally implements a requestConfig interface of IServiceApi. During implementation, the advertising component calls an SSP interface to request the mediation advertising platform configured on the SSP, and returns the requested configuration information to the mediation SDK. The advertising component may be implemented by the following program code. However, in actual application, program code implementing the advertising component is not limited to the following program code. Other implementations that can implement the advertising component are also applicable to this application.

```
interface IServiceApi {
    // request a configuration
    String requestConfig( );
}
```

It should be noted that when the mediation SDK requests the configuration information from HMS Core in a case in which the app developer does not select a required advertising platform on the SSP or is selecting a required advertising platform, an error code is returned; and when the mediation SDK requests the configuration information from HMS Core in a case in which the app developer already selects an advertising platform on the SSP, the configuration information in the SSP is returned.

HMS Core may perform the following step.

Step 503: Send a configuration information request to the SSP by using the advertising component.

The SSP may perform the following steps.

Step 504: Search for the information list of SDKs of advertising platforms that support ad mediation.

Step 505: Return the information list of SDKs of advertising platforms that support ad mediation.

It should be noted that after receiving the configuration information request sent by the advertising component, the SSP may search the configuration information for the information list of SDKs of advertising platforms that support ad mediation, and return the information list to the advertising component, so that the advertising component can return the information list of SDKs of advertising platforms that support ad mediation to the mediation SDK.

Then, HMS Core may perform the following step.

Step 506: Return the information list returned by the SSP to the mediation SDK by using the advertising component.

The app may perform the following step.

Step 507: Load the advertising SDK integrated package in HMS Core by using a DynamicLoader module in the mediation SDK.

It should be noted that the DynamicLoader module in the mediation SDK can provide a remote module loading capability, and is configured to remotely and dynamically load the advertising SDK integrated package from HMS Core into a process of the app. On an Android platform, the DynamicLoader module may load a remote Android application package (android package, APK) in a DexLoader manner, and then load code in the APK package in a reflection manner. In this way, code in a remote component, that is, code corresponding to the advertising SDK integrated package, can be accessed when the app is running. The DynamicLoader module may be understood as providing a calling interface for the mediation SDK, and may be implemented by the following program code. However, in actual application, program code implementing the DynamicLoader module is not limited to the following program code. Other implementations that can implement the DynamicLoader module are also applicable to this application.

```
interface MediationDynamicLoader {
/**
* load a remote SDK of an advertising platform
* @param sdkIds : list of ids of SDKs of advertising platforms configured on the SSP
* @param listener : callback when an SDK is loaded
*/
  void loadSdk(String[ ] sdkIds, SdkLoadListener listener);
}
public interface SdkLoadListener {
/**
* callback when the SDK is loaded successfully
* @param adapters : === adapter implementation class object of an advertising SDK,
held and accessed by an adapter interface
*/
  void onSdkLoaded(List<? extends MediationAdapter> adapters);
}
```

In addition, the DynamicLoader module can dynamically and remotely load an SDK of an advertising platform in the advertising SDK integrated package, associate a corresponding adapter implementation class with the adapter interface, and return a result to the mediation SDK. After the DynamicLoader module loads a remote advertising SDK and code of corresponding adapter implementation into a process of the app, the mediation SDK associates the adapter implementation class (for example, NativeAdLoaderAdapterImpl) with the mediation adapter interface (for example, NativeAdLoaderAdapter) through reflection. In this way, a function of a relevant advertising SDK can be accessed by using NativeAdLoaderAdapter.

It should be further noted that the advertising SDK integrated package may include SDKs of advertising platforms that support ad mediation and that are selected by the app developer, and code of an adapter implementation class corresponding to each SDK. The adapter implementation class may be implemented by the following program code. However, in actual application, program code implementing the adapter implementation class is not limited to the following program code. Other implementations that can implement the adapter implementation class are also applicable to this application.

```
public class NativeAdLoaderAdapterSdkImpl {
public void loadAd(String adId, LoadListenerAdapter listener) {
// call a native advertisement loader of a specific advertising SDK, and return loaded
advertisement content
}
}
```

Step 508: Receive, by using the DynamicLoader module in the mediation SDK, information indicating that the advertising SDK integrated package is successfully loaded.

Step 509: Call an API interface in the mediation SDK by using an advertisement-related module in the app to access advertisement-related information.

The advertisement-related module is a module configured by the app developer by using program code. When a user uses the app, the advertisement-related module may call the API interface, to present an advertisement on the app. The advertisement-related information includes pictorial, text, or audio information of an advertisement, information about an advertisement position, duration of advertisement presentation, and the like. This is not specifically limited herein in this application.

It should be noted that to present an advertisement on an app by using the solutions provided in this application, an advertisement loader interface, that is, an API, needs to be defined, so that a developer can invoke the mediation SDK by using the API. The following uses presenting a native advertisement on an app for description. A calling process of an API may be illustrated by using the following program code. However, in actual application, defining the native advertisement API is not limited only to the following program code. Other implementations that can implement defining of the native advertisement API are also applicable to this application.

```
public interface NativeAdLoader {
/**
* load a native advertisement
* @param adId : advertisement position ID, used to request an advertisement required
```

-continued

```
by a relevant advertisement position
  * @param listener : The LoadListener is an advertisement loading status callback
interface, configured to return a status code when loading fails and advertisement content when
loading succeeds
  */
    void loadAd(String adId, LoadListener listener);
  }
  public interface LoadListener {
  /**
  * call back an error code when loading fails
  * @param code : error code returned upon failure
  */
  void onFail(int code);
  /**
  * return advertisement content when loading succeeds
  * @param nativeAds : content list of the native advertisement
  */
  void onSuccess(List<NativeAd> nativeAds);
  }
```

Step 510: Invoke the advertisement-related information by using the mediation adapter interface in the mediation SDK.

It should be further noted that the mediation adapter interface in the mediation SDK may be configured to interwork with SDKs of different advertising platforms. In this application, a mediation adapter interface for native advertisements is defined by using the following program code. However, in actual application, defining the mediation adapter interface for native advertisements is not limited to the following program code. Other implementations that can implement defining of the mediation adapter interface for native advertisements are also applicable to this application.

```
  // mediation adapter interface for native advertisements, which is configured to
interwork with SDKs of advertising platforms, so that advertisement-related content can be
presented, and a corresponding implementation class can be invoked by using the interface
  public interface NativeAdLoaderAdapter extends MediationAdapter {
    /**
      * load an advertisement
      * @param adId: advertisement position ID
      * @param listener : advertisement loading result callback listener
      */
    void loadAd(String adId, LoadListenerAdapter listener);
  }
  // advertisement loading result callback listener
  public interface LoadListenerAdapter {
      /**
      when loading the advertisement fails
      * @param code: error code
      */
      void onFail(int code);
      /**
      * when loading the advertisement succeeds
      * @param nativeAds : content list of the advertisement
      */
      void onSuccess(List<NativeAd> nativeAds);
  }
```

If the advertising SDK integrated package needs to be updated, the SSP may perform the following step.

Step 511: Update the advertising SDK integrated package based on an updated advertising platform on the SSP.

It should be noted that after obtaining the information list of SDKs of advertising platforms that support ad mediation, the app may load the advertising SDK integrated package in the mobile service by using the dynamic loader module. After loading succeeds, an advertisement is presented at a corresponding advertisement position on the app. For example, an advertiser 1 places an advertisement on an advertising platform 1. After an app corresponding to an app developer that cooperates with the advertising platform 1 obtains an operation of a user tapping the app, the advertisement of the advertiser 1 is presented when the app is open. If an advertising platform that supports ad mediation changes, the developer only needs to directly update the advertising SDK integrated package on the SSP.

It should be noted that when the app requests the configuration information from the advertising component in HMS Core in response to a tap operation of an app user, and the advertising component in HMS Core forwards the configuration information request to the SSP, the information list of SDKs is returned if the app developer configures, on the SSP, a required advertising platform that supports ad mediation, and an error code is returned if the app developer does not configure, on the SSP, a required advertising platform that supports ad mediation. The SSP generates the advertising SDK integrated package based on the required advertising platform that supports ad mediation, and transmits the advertising SDK integrated package to HMS Core. The advertising SDK integrated package in HMS Core is loaded by the DynamicLoader module in the app. After loading succeeds, advertisement-related information corresponding to each advertising platform in the information list of SDKs is invoked by the API in the app, to present advertisement information on a screen of the app.

In addition, when an advertising platform that supports ad mediation is newly added to or deleted from the app, the app developer only needs to reconfigure, on the SSP, a required advertising platform that supports ad mediation. The SSP updates the advertising SDK integrated package based on the reconfigured advertising platform that supports ad mediation. The app only needs to invoke an updated advertising SDK integrated package. Moreover, if the app wants to advertise for an advertiser corresponding to an advertising platform, the app developer only needs to download the mediation SDK. In this way, a quantity of times the app is frequently upgraded is reduced. In addition, when an advertising platform that supports ad mediation changes, the app developer does not need to recompile code, reducing a workload of the app developer. Besides, in this manner, upgrading the app can be decoupled from adding or deleting an SDK of an advertising platform that supports ad mediation, improving efficiency of data processing, and also avoiding occurrence of a case in which the app developer frequently upgrades the app.

The data processing method provided in this application may be performed by a server of a service provider, or may be performed by a network device with a data processing function. This is not specifically limited herein. The following uses an example for description in which an execution body is a server. The server may be a cloud server or a physical server. A form of the server is not specifically limited in this application.

Figure 6:
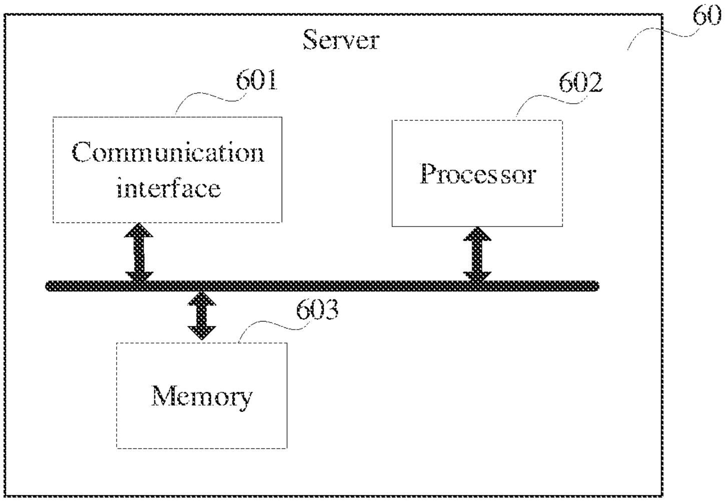
FIG. 6 is a schematic diagram of a structure of a server according to an embodiment of this application.

FIG. 6 is an example of a schematic diagram of a structure of a server according to an embodiment of this application. As shown in FIG. 6, a server 60 includes a communication interface 601, a processor 602, and a memory 603. Further, the server 60 may further include a bus system. The processor 602, the memory 603, and the communication interface 601 may be connected to each other by using the bus system.

The processor 602 may be a chip. For example, the processor 602 may be a field programmable gate array (field programmable gate array, FPGA), a dedicated integrated chip (application specific integrated circuit, ASIC), a system-on-a-chip (system on chip, SoC), a central processing unit (central processor unit, CPU), a network processor (network processor, NP), a digital signal processing circuit (digital signal processor, DSP), a microcontroller (micro controller unit, MCU), a programmable controller (programmable logic device, PLD), or another integrated chip.

It should be noted that the processor 602 in this embodiment of this application may be an integrated circuit chip and has a signal processing capability. In an implementation process, the steps in the foregoing method embodiment may be completed by an integrated logic circuit in a form of hardware or instructions in a form of software in the processor. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by means of a hardware decoding processor, or may be executed and accomplished by using a combination of hardware and software modules in the decoding processor. A software module may be located in a mature storage medium in the aft, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory 603 may be a volatile memory or a nonvolatile memory, or may include both a volatile memory and a nonvolatile memory. The nonvolatile memory may be a read-only memory (read-only memory, ROM), a programmable read-only memory (programmable read-only memory, PROM), an erasable programmable read-only memory (erasable programmable read-only memory, EPROM), an electrically erasable programmable read-only memory (electrically erasable programmable read-only memory, EEPROM), or a flash memory. The volatile memory may be a random access memory (random access memory, RAM) and is used as an external cache. By using an example description but not a restrictive description, RAMs in many forms may be used, for example, a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM), an enhanced synchronous dynamic random access memory (enhanced synchronous dynamic random access memory, ESDRAM), a synchlink dynamic random access memory (synchlink dynamic random access memory, SLDRAM), and a direct rambus random access memory (direct rambus random access memory, DR RAM). It should be noted that the memory of the system and methods described in this specification includes but is not limited to these and any memory of another proper type.

The communication interface 601 may be configured to input and/or output information. In an optional implementation solution, when the server includes a transceiver, method steps performed by the communication interface 601 may be alternatively performed by the transceiver.

The memory 603 is configured to store computer-executable instructions for performing embodiments of this application, and the processor 602 controls execution. The processor 602 is configured to execute the computer-executable instructions stored in the memory 603, to implement the audio generation method provided in embodiments of this application. Alternatively, optionally, in this embodiment of this application, the processor 602 may perform processing-related functions in the data processing methods provided in the following embodiments of this application, and the communication interface 601 is responsible for communicating with another device or a communication network. This is not specifically limited in this embodiment of this application. Optionally, the computer-executable instructions in this embodiment of this application may also be referred to as application program code. This is not specifically limited in this embodiment of this application.

Figure 7:
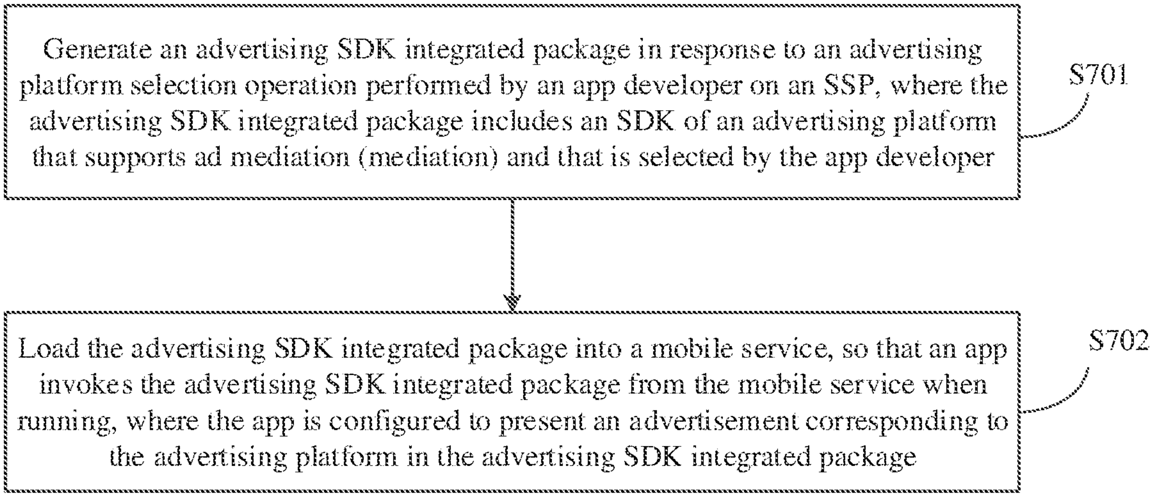
FIG. 7 is a schematic flowchart of a data processing method according to an embodiment of this application.

In addition, when data processing is performed based on the server structure shown in FIG. 6, reference may be made to a data processing flowchart shown in FIG. 7.

Step 701: Generate an advertising SDK integrated package in response to an advertising platform selection operation performed by an app developer on an SSP, where the advertising SDK integrated package includes an SDK of an advertising platform that supports ad mediation and that is selected by the app developer.

Step 702: Load the advertising SDK integrated package into a mobile service, so that an app invokes the advertising SDK integrated package from the mobile service when running, where the app is configured to present an advertisement corresponding to the advertising platform in the advertising SDK integrated package.

In step 702 above, the advertising SDK integrated package is loaded into the mobile service, so that the app invokes the advertising SDK integrated package by using the mobile service. In this way, a workload of the app developer is further reduced.

For example, when the app developer needs to add or delete an advertising platform, the app developer only needs to reselect an advertising platform on the SSP. A server may update the advertising SDK integrated package based on the reselected advertising platform. In this way, a case is avoided in which the app needs to be frequently upgraded when an advertising platform is added or deleted.

In an embodiment, the server receives a selection operation performed by the app developer on the SSP for advertising platform updating, and may update the advertising SDK integrated package; and the server loads an updated advertising SDK integrated package into the mobile service.

In an embodiment, configuration information is determined in response to the advertising platform selection operation performed by the app developer on the SSP, so that the app invokes the advertising SDK integrated package based on the configuration information, where the configuration information includes an information list of SDKs of advertising platforms that support ad mediation.

Figure 8:
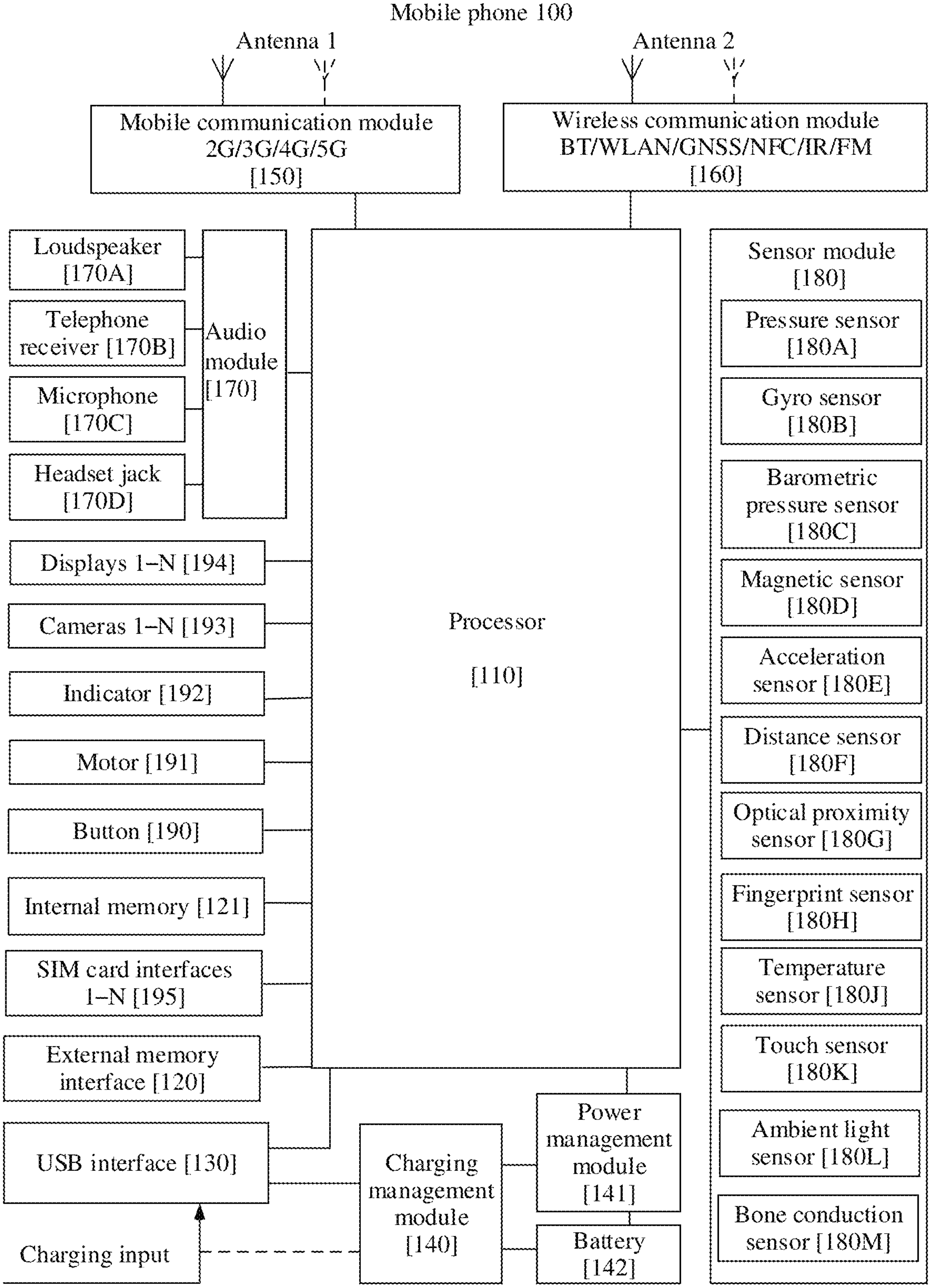
FIG. 8 is a schematic diagram of a structure of a terminal device according to an embodiment of this application.

The data processing method provided in this application may be performed by a terminal device. FIG. 8 is an example of a schematic diagram of a structure of a terminal device according to an embodiment of this application. In FIG. 8, a mobile phone is used as an example for presentation. It should be understood that FIG. 8 is merely an example. The mobile phone 100 may have more or fewer components than those shown in the figure, may combine two or more components, or may have different component configurations. The components shown in the figure may be implemented in hardware including one or more signal processing and/or application-specific integrated circuits, software, or a combination of hardware and software.

The following describes the components of the mobile phone 100 in detail with reference to FIG. 8.

A processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate components, or may be integrated into one or more processors. The controller may be a nerve center and a command center of the mobile phone 100. The controller may generate an operation control signal based on an instruction operation code and a timing signal, to complete control of instruction fetching and execution.

A memory may be further disposed in the processor no, and is configured to store instructions and data. In some embodiments, the memory in the processor no is a cache. The cache may store instructions or data recently used or cyclically used by the processor no. If the processor no needs to use the instructions or the data again, the processor no may directly invoke the instructions or the data from the cache. This avoids repeated access and reduces a waiting time of the processor no, improving efficiency of a system.

When different components are integrated into the processor no, for example, a CPU and a GPU are integrated, the CPU and the GPU may cooperate to perform the operation prompt method provided in embodiments of this application. For example, in the operation prompt method, some algorithms are performed by the CPU, and other algorithms are performed by the GPU, to achieve high processing efficiency.

In some embodiments, the processor no may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone 100 may include one or N displays 194, where N is a positive integer greater than 1.

An internal memory 121 may be configured to store computer-executable program code, and the executable program code includes instructions. The internal memory 121 may include a program storage area and a data storage area. The program storage area may store an operating system, an application program required by at least one function (for example, a sound play function or an image play function), and the like. The data storage area may store data (for example, audio data or a phone book) and the like that are created during use of the mobile phone 100. In addition, the internal memory 121 may include a high-speed random access memory, and may further include a nonvolatile memory, for example, at least one magnetic disk storage device, flash memory, or universal flash storage (universal flash storage, UFS). By running the instructions stored in the internal memory 121 and/or the instructions stored in the memory that is disposed in the processor, the processor 110 executes various functional applications and data processing of the mobile phone loo.

An audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

A loudspeaker 170A, also referred to as a "horn", is configured to convert an audio electrical signal into a sound signal. When using the mobile phone loo, a user may listen to music or answer a call in a hands-free mode by using the loudspeaker 170A.

A microphone 170C, also referred to as a "mike" or a "mic", is configured to convert a sound signal into an electrical signal. When making a call or sending voice information, a user may talk into the microphone 170C, to input a sound signal into the microphone 170C. At least one microphone 170C may be disposed in the mobile phone loft In some other embodiments, two microphones 170C may be disposed in the mobile phone loo, to collect a sound signal and further implement a noise reduction function. In some other embodiments, three, four, or more microphones 170C may be alternatively disposed in the mobile phone loo, to collect a sound signal, implement noise reduction, identify a sound source, implement a directional recording function, and the like.

In addition to the foregoing content, as shown in FIG. 8, the mobile phone 100 may further include an external memory interface 120, the internal memory 121, a universal serial bus (universal serial bus, USB) interface 130, a charging management module 140, a power management module 141, a battery 142, an antenna 1, an antenna 2, a mobile communication module 150, a wireless communication module 160, a telephone receiver 170B, a headset jack 170D, a sensor module 180, a button 190, a motor 191, an indicator 192, a camera 193, the display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. Although not shown in FIG. 8, the mobile phone 100 may further include a bluetooth apparatus, a positioning apparatus, a flash, a miniature projection apparatus, a near field communication (near field communication, NFC) apparatus, and the like. Details are not described herein.

Figure 9:
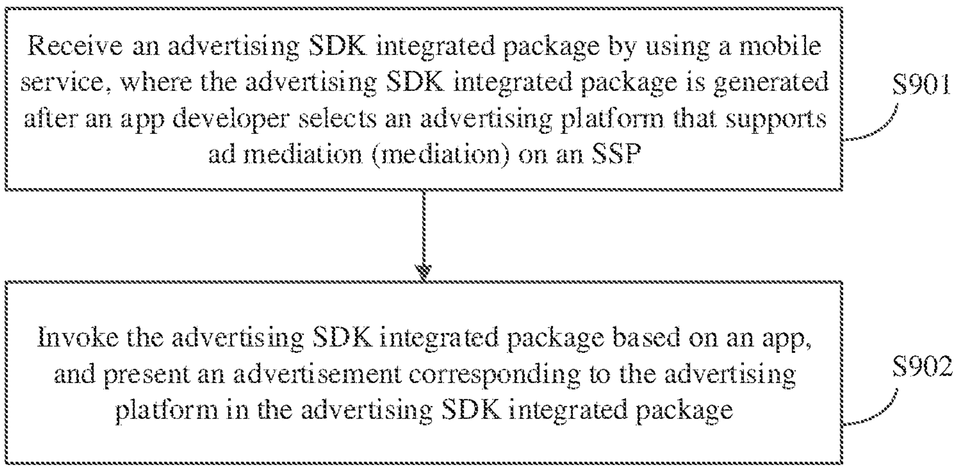
FIG. 9 is a schematic flowchart of a data processing method according to an embodiment of this application.

In addition, when data processing is performed based on the terminal device structure shown in FIG. 8, reference may be made to a data processing flowchart shown in FIG. 9.

Step 901: Receive an advertising SDK integrated package by using a mobile service, where the advertising SDK integrated package is generated after an app developer selects an advertising platform that supports ad mediation on an SSP.

Step 902: Invoke the advertising SDK integrated package based on an app, and present an advertisement corresponding to the advertising platform in the advertising SDK integrated package.

It should be noted that when the app developer needs to add or delete an advertising platform, the app developer only needs to reselect an advertising platform on the SSP. A server may update the advertising SDK integrated package based on the reselected advertising platform. In this way, a case is avoided in which the app needs to be frequently upgraded when an advertising platform is added or deleted.

In an embodiment, the app may include a mediation adapter interface and a DynamicLoader module. A terminal device may load the advertising SDK integrated package by using the DynamicLoader module; and interwork with SDKs of different advertising platforms in the advertising SDK integrated package by using the mediation adapter interface.

In an embodiment, the mobile service further includes an advertising component. The terminal device may create an information transmission channel between the app and the SSP by using the advertising component.

In an embodiment, the terminal device may obtain configuration information, and invoke the advertising SDK integrated package based on the app and the configuration information, where the configuration information is determined in response to an advertising platform selection operation performed by the app developer on the SSP.

Based on the foregoing embodiments, an embodiment of this application further provides a readable storage medium. The readable storage medium stores instructions. When the instructions are executed, the method performed by the security detection device in any one of the foregoing embodiments is implemented. The readable storage medium may include any medium that can store program code, such as a USB flash drive, a removable hard disk, a read-only memory, a random access memory, a magnetic disk, or a compact disc.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, and an optical memory) that include computer-usable program code.

This application is described with reference to the flowcharts and/or block diagrams of the method, the apparatus (system), and the computer program product according to this application. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a function specified in one or more processes in the flowcharts and/or in one or more blocks in the block diagrams.

These computer program instructions may be alternatively stored in a computer-readable memory that can instruct a computer or another programmable data processing apparatus to work in a specific manner, so that the instructions stored in the computer-readable memory generate an artifact that includes an instruction apparatus. The instruction apparatus implements a function specified in one or more processes in the flowcharts and/or in one or more blocks in the block diagrams.

These computer program instructions may be alternatively loaded onto a computer or another programmable data processing apparatus, so that a series of operations and steps are performed on the computer or the another programmable apparatus, to generate computer-implemented processing. Therefore, the instructions executed on the computer or the another programmable apparatus provide steps for implementing a function specified in one or more processes in the flowcharts and/or in one or more blocks in the block diagrams.

What is claimed is:

1. A data processing method, comprising:

generating, by a server, an advertising software development kit (SDK) integrated package in response to an advertising platform selection operation performed on a media service platform (SSP), wherein the advertising SDK integrated package comprises an SDK of a selected advertising platform that supports advertisement (ad) mediation;

loading, by the server, the advertising SDK integrated package into a mobile service, wherein an app invokes the advertising SDK integrated package from the mobile service when running, and wherein the app is configured to present an advertisement corresponding to the advertising platform in the advertising SDK integrated package; and transmitting, to the app by the mobile service, configuration information, wherein the configuration information comprises an information list of SDKs of advertising platforms that support ad mediation, the information list including names of the advertising platforms and a number of the SDKs of the advertising platforms, wherein the mobile service is a mobile service architecture installed on a terminal device that provides a plurality of service capabilities to a plurality of apps running on the terminal device, and the app is one of the plurality of apps, and wherein the advertising SDK integrated package further comprises code of an adapter implementation class corresponding to the SDK of the selected advertising platform.

2. The method according to claim 1, wherein the generating the advertising SDK integrated package in response to the advertising platform selection operation performed on the SSP comprises:

determining, in response to the advertising platform selection operation performed on the SSP, a selected advertising platform that supports ad mediation; and generating the advertising SDK integrated package by packing an SDK of the selected advertising platform that supports ad mediation.

3. The method according to claim 1, further comprising:

receiving a selection operation performed on the SSP for advertising platform updating;

updating the advertising SDK integrated package; and loading the updated advertising SDK integrated package into the mobile service.

4. The method according to claim 1, further comprising:

determining the configuration information in response to the advertising platform selection operation performed on the SSP, wherein the app invokes the advertising SDK integrated package based on the configuration information.

5. A data processing method, comprising:

requesting, by a terminal device, configuration information from a mobile service;

receiving, by the terminal device, the configuration information and an advertising software development kit (SDK) integrated package using the mobile service, wherein the advertising SDK integrated package is generated after selecting an advertising platform that supports advertisement (ad) mediation on a media service platform (SSP);

invoking, by the terminal device, the advertising SDK integrated package based on an app and the configuration information; and presenting, by the terminal device, an advertisement corresponding to the advertising platform in the advertising SDK integrated package, wherein the mobile service is a mobile service architecture installed on the terminal device that provides a plurality of service capabilities to a plurality of apps running on the terminal device, and the app is one of the plurality of apps, wherein the configuration information comprises an information list of SDKs of advertising platforms that support ad mediation, the information list including names of the advertising platforms and a number of the SDKs of the advertising platforms and wherein the advertising SDK integrated package further comprises code of an adapter implementation class corresponding to the SDK of the selected advertising platform.

6. The method according to claim 5, wherein the app comprises a mediation adapter interface and a dynamic loader module, and wherein the invoking the advertising SDK integrated package based on the app comprises:

loading the advertising SDK integrated package by using the dynamic loader module; and interworking with SDKs of different advertising platforms in the advertising SDK integrated package using the mediation adapter interface.

7. The method according to claim 5, wherein the mobile service further comprises an advertising component, and wherein the method further comprises:

creating an information transmission channel between the app and the SSP using the advertising component.

8. The method according to claim 5, wherein the configuration information is determined in response to selecting an advertising platform on the SSP.

9. A server, wherein the server comprises:

one or more processors; and one or more non-transitory computer-readable storage media storing a program to be executed by the one or more processors, the program including instructions for:

generating an advertising software development kit (SDK) integrated package in response to an advertising platform selection operation performed on a media service platform (SSP), wherein the advertising SDK integrated package comprises an SDK of a selected advertising platform that supports advertisement (ad) mediation;

loading the advertising SDK integrated package into a mobile service, wherein an app invokes the advertising SDK integrated package from the mobile service when running, and wherein the app is configured to present an advertisement corresponding to the advertising platform in the advertising SDK integrated package; and transmitting, to the app by the mobile service, configuration information, wherein the configuration information comprises an information list of SDKs of advertising platforms that support ad mediation, the information list including names of the advertising platforms and a number of the SDKs of the advertising platforms, wherein the mobile service is a mobile service architecture installed on a terminal device that provides a plurality of service capabilities to a plurality of apps running on the terminal device, and the app is one of the plurality of apps, and wherein the advertising SDK integrated package further comprises code of an adapter implementation class corresponding to the SDK of the selected advertising platform.

10. The server according to claim 9, wherein the instructions further include instructions for:

determining, in response to the advertising platform selection operation performed on the SSP, a selected advertising platform that supports ad mediation; and generating the advertising SDK integrated package by packing an SDK of the selected advertising platform that supports ad mediation.

11. The server according to claim 9, wherein the instructions further include instructions for:

receiving a selection operation performed on the SSP for advertising platform updating;

updating the advertising SDK integrated package; and loading the updated advertising SDK integrated package into the mobile service.

12. The server according to claim 9, wherein the instructions further include instructions for:

determining the configuration information in response to the advertising platform selection operation performed on the SSP, wherein the app invokes the advertising SDK integrated package based on the configuration information.

13. The method according to claim 1, wherein the app configured to present the advertisement corresponding to the advertising platform in the advertising SDK integrated package comprises an advertisement presented on an initial screen of the app.

14. The method according to claim 1, wherein the app configured to present the advertisement corresponding to the advertising platform in the advertising SDK integrated package comprises an advertisement presented on an operation page of the app.

15. The method according to claim 14, wherein the advertisement presented on the operation page of the app is a banner advertisement.

16. The method according to claim 5, wherein presenting, by the terminal device, the advertisement corresponding to the advertising platform in the advertising SDK integrated package comprises presenting an advertisement on an initial screen of the app.

17. The method according to claim 5, wherein presenting, by the terminal device, the advertisement corresponding to the advertising platform in the advertising SDK integrated package comprises presenting an advertisement on an operation page of the app.

18. The method according to claim 17, wherein the advertisement presented on the operation page of the app is a banner advertisement.

19. The server according to claim 9, wherein the app configured to present an advertisement corresponding to the advertising platform in the advertising SDK integrated package comprises an advertisement presented on an initial screen of the app.

20. The server according to claim 9, wherein the app configured to present an advertisement corresponding to the advertising platform in the advertising SDK integrated package comprises an advertisement presented on an operation page of the app.

21. The server according to claim 20, wherein the advertisement presented on the operation page of the app is a banner advertisement.

* * * * *